United States Patent [19]

Sakai

[11] Patent Number: 5,055,929
[45] Date of Patent: Oct. 8, 1991

[54] GHOST CANCELER FOR TELEVISION AND VIDEO TAPE RECORDER

[75] Inventor: Toshihisa Sakai, Osaka, Japan

[73] Assignee: NEC Home Electronics Ltd., Osaka, Japan

[21] Appl. No.: 458,360

[22] Filed: Dec. 28, 1989

[30] Foreign Application Priority Data

Dec. 28, 1988 [JP] Japan .................. 63-332083

[51] Int. Cl.$^5$ .............................. H04N 5/21
[52] U.S. Cl. ...................... 358/166; 358/905
[58] Field of Search ............... 358/166, 167, 181, 185, 358/905, 336, 341

[56] References Cited

U.S. PATENT DOCUMENTS 4,296,435 10/1981 d'Hautecourt ............... 358/166
4,698,680 10/1987 Lewis, Jr. ..................... 358/905

FOREIGN PATENT DOCUMENTS 189053 8/1983 Japan .

Primary Examiner—Tommy P. Chin
Attorney, Agent, or Firm—Cushman, Darby & Cushman

[57] ABSTRACT

A ghost canceler having first and second terminal groups. The first terminal group is coupled to a television receiver and the second terminal group is available for coupling to a video tape recorder (VTR). The first terminal group includes terminals for receiving an original video signal from the television to be ghost canceled, commands for causing ghost canceling processing to be carried out, information regarding television channel changes and sound signals from the television receiver. The first terminal group also includes an output terminal for transmitting to the television receiver the original video signal as it is within a period in which the input terminal group does not receive the commands for performing the ghost canceling processing, or a predetermined period immediately after the input terminal group receives information about the switch of the channels, the output terminal transmitting to the television receiver a video signal ghost canceled with respect to the original video signal at other times. The second terminal group including a video output terminal for outputting the ghost canceled video signal or the original video signal received from the television receiver to the VTR and sound terminals for outputting a sound signal received from the television receiver as is to the VTR.

2 Claims, 2 Drawing Sheets

GHOST CANCELER FOR TELEVISION AND VIDEO TAPE RECORDER

BACKGROUND OF THE INVENTION

1. Field of the Invention

The present invention relates to a ghost canceler for use in combination with high quality television receivers, etc.

2. Description of the Related Art

In high quality television receivers such as EDTV, IDTV, etc., a television video signal in an NTSC standard format is converted to a digital signal. Once in digital form, the video signal is processed in various ways to improve image quality. This processing of the video signal includes such processing as: 1) line sequential scanning conversion by line interpolation, 2) removal of noises, and 3) compensation of contour.

In such high quality television receivers, a ghost canceler is added to effectively improve upon the above-described various kinds of signal processing to enhance image quality. Ghost cancelers come in two main types. One type is built-in to the television receiver body. Another type is external and coupled to the television. This second type, sometimes referred to as an "adapter type", is coupled to the television receiver, but remains outside the television receiver body.

Conventionally, signals are input and output between a ghost canceler of the adapter type and a television receiver as shown in FIG. 1 (PRIOR ART). Namely, a video signal subjected to a ghost canceling processing is transmitted to a ghost canceler 30 through a signal line 41 from a television receiver 20. Then, a ghost-canceled video signal is returned to the television receiver 20 through a signal line 42 from the ghost canceler 30. Signal lines 41 and 42 share a common ground line 43.

The conventional ghost canceler shown in FIG. 1 (PRIOR ART) only returns its ghost canceled video signal to the television receiver. Therefore, the ghost canceled video signal cannot be directly supplied to a picture recording input terminal of a video tape recorder (VTR) without first passing through the television receiver, which is inconvenient.

There has been one proposed one construction in which an output terminal is provided on the ghost canceler for supplying the ghost-cancelled video signal. In this construction, a video signal can be supplied directly to a VTR. However, even using such a construction, it is necessary to run a separate cable from the television receiver to the VTR to record sound along with the video signal. Therefore, it is necessary to use separate cables for video and sound systems. This makes VTR recording operation somewhat complicated.

Further, the use of an external ghost processor is particularly awkward in case that the use of the ghost canceler is not required. It is necessary to provide, when the ghost canceler is not used, a loop to return the video signal from one part of the television (that would have been coupled to the ghost canceler) to another part of the television (that would have received a signal from the ghost canceler). Thus, there must be a signal loop within the television receiver. Therefore it is necessary to provide a video switching circuit for switching the video signal to flow back into the television when the ghost canceler is not used. This is rather cumbersome.

Also, conditions of ghosts in the television signal are different on each channel. Therefore, when a user switches from one channel to another, the previous ghost canceling function may deteriorate immediately after the channel is changed. At that time, the ghost canceler may cause a video "disturbance" to appear on the television screen that is more irritating to a television watcher than the ghost itself.

SUMMARY OF THE INVENTION

In order to overcome the above-mentioned problems, an object of the present invention is to provide a ghost canceler that is more convenient to use than known ghost cancelers.

Another object of the present invention is to provide a ghost canceler which does not require the use of a switching circuit for forming a return loop within a television receiver when ghost canceling processing is not required.

A further object of the present invention is to provide a ghost canceler which does not cause a video disturbance to appear on the television screen when a television watcher changes the channels of the television receivers.

The above objects can be achieved by a ghost canceler which, according to the present invention, has a configuration different from those known in the prior art. More specifically, a first terminal group of the present invention includes a group of input terminals, for receiving an original video signal which is to be subjected to a ghost canceling processing, commands for causing the ghost canceling processing to be carried out, information for switching channels, and a sound signal from a television receiver. An output terminal transmits to the television receiver the original video signal as it is (without having been ghost-canceling processed) within a time period during which the input terminal group does not receive any commands for causing ghost canceling processing to be performed, or during a predetermined period immediately after the input terminal group receives information indicating a channel change.

The output terminal transmits to the television receiver a video signal that is subjected to ghost canceling processing with respect to the original video signal within the other period (when ghost canceling processing is commanded).

A second terminal group includes a video output terminal for outputting the ghost-canceled video signal or the original video signal (not ghost-cancelled) received from the television receiver. The second terminal group also includes a sound output terminal for outputting a sound signal received from the television receiver without modification.

Thus, the first terminal group includes the sound input terminal and the second terminal group includes the ghost-canceled video signal and the sound output terminal. Accordingly, it is possible to supply the sound signal and the ghost-canceled video signal, without coupling the television receiver directly, to a VTR.

The input terminal receives the ghost canceling commands from the television receiver, and outputs the ghost-canceled video signal only during the time period that ghost canceling is commanded. Accordingly, it is not necessary to provide a switching circuit for forming a return loop within the television receiver when ghost canceling is not required. An input terminal receives information related to channel changing from the television receiver, and outputs the original video signal (not ghost-cancelled) during a predetermined period immediately after the reception of information indicating a channel change. Accordingly, the disturbance on the display screen that would otherwise be caused by a prior art ghost canceler during a channel change can effectively be avoided.

BRIEF DESCRIPTION OF THE DRAWINGS

The presently preferred embodiment of the invention will be described in greater detail with reference to the accompanying drawings in which.

DESCRIPTION OF THE PREFERRED EMBODIMENTS

The preferred embodiments of a ghost canceler of the present invention will now be described in detail with reference to the accompanying drawings.

Figure 2:
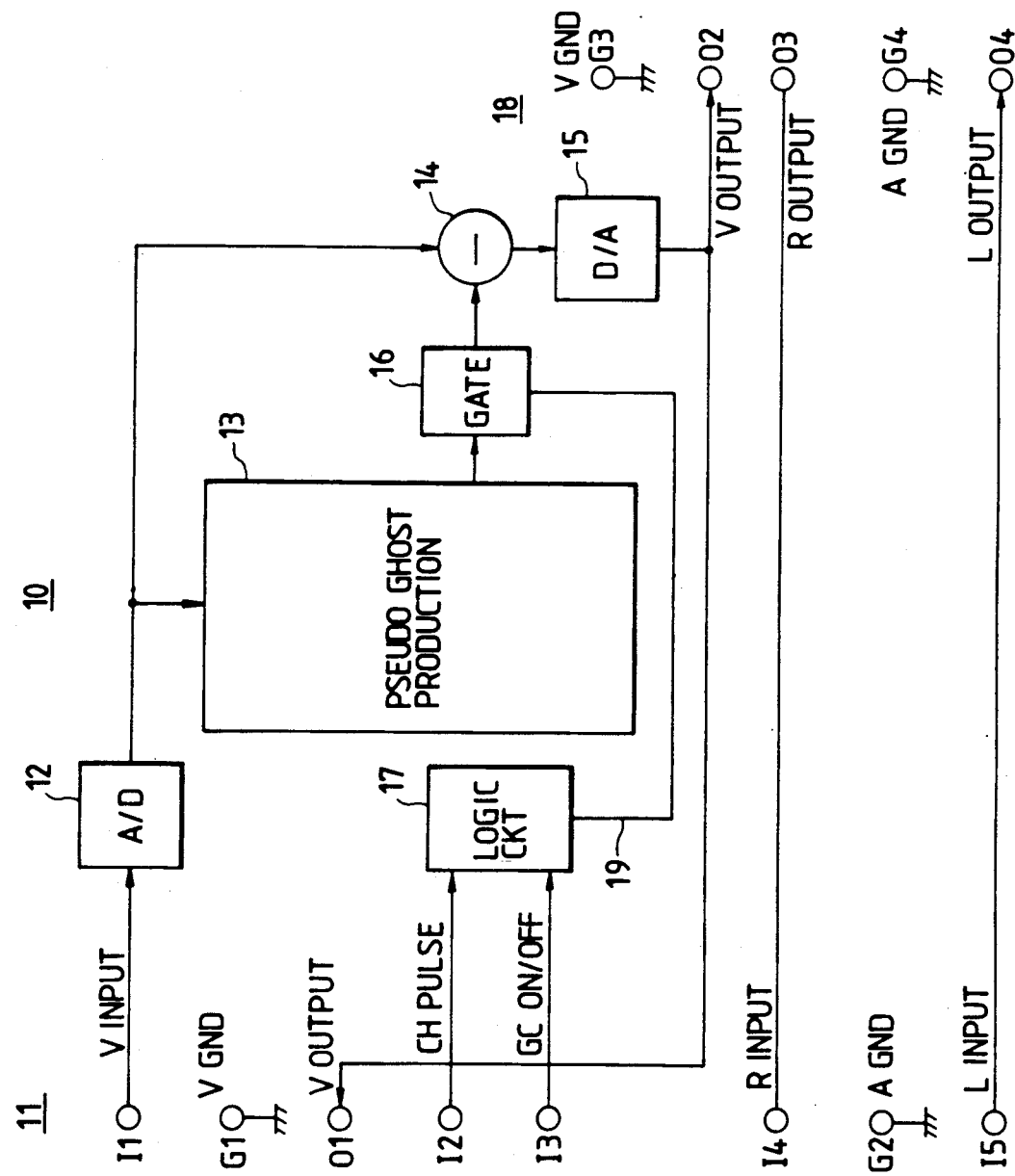
FIG. 2 is a block diagram of a ghost canceler in accordance with the invention.

FIG. 2 is a block diagram showing the construction of a ghost canceler 10 in one embodiment of the present invention.

A group of terminals 11 provides input/output terminal connections for a television receiver. Terminal group 11 includes terminals $I_1$, $G_1$, $O_1$, $I_2$, $I_3$, $I_4$, $G_2$, and $I_5$. Another group of terminals 18 provides input/output terminal connections for a VTR. Terminal group 18 includes terminals $G_3$, $O_2$, $O_3$, $G_4$, and $O_4$. Terminal $I_4$ is hard wired to terminal $O_3$ and terminal $I_5$ is hard wired to terminal $O_4$. Terminals $G_2$ and $G_4$ are ground terminals.

An analog-to-digital (A/D) converting circuit 12 converts analog video signals supplied from the television receiver to terminal $I_1$ into digital form. An output of A/D converting circuit 12 is coupled to an input of a pseudo ghost producing circuit 13. An output of A/D circuit 12 is also coupled to an input of a subtracting circuit 14. A gate circuit 16 provides a second input to subtracting circuit 14. An output of subtracting circuit 14 provides input to a digital-to-analog (D/A) converting circuit 15. The output of D/A converting circuit 15 is coupled to an output terminal $O_2$ of the output terminal group 18 connecting to the VTR. The output of D/A converting circuit 15 is also coupled to a terminal $O_1$ of terminal group 11. A logic circuit 17 receives input from terminals $I_2$ and $I_3$ of terminal group 11. The output of logic circuit 17 is coupled to an input of gate circuit 16 via a signal line 19.

In terminal group 11, input terminal $I_1$ carries a video signal from the television to be ghost canceled. Output terminal $O_1$ carries the ghost-canceled video signal. Ground terminal $G_1$ is common to the video signals on terminals $I_1$ and $O_1$. Input terminal $I_2$ carries a channel pulse from the television receiver to the input of logic circuit 17. Input terminal $I_3$ carries a GC ON/OFF signal which provides commands indicating whether or not it is necessary to perform ghost canceling processing. Input terminal $I_4$ carries the right channel sound signal. Input terminal $I_5$ carries the left channel sound signal. An audio ground terminal $G_2$ provides a ground path for both sound channels.

Output terminal $O_2$ carries a video signal to the VTR. The ground return of the video signal is on terminal $G_3$. Output terminal $O_3$ carries the right channel sound signal. Output terminal $O_4$ carries the left channel sound signal. The ground return for both audio channels is on terminal $G_4$.

The operation of the ghost canceler 10 thus constructed will be described in detail.

The video signal to be subjected to a ghost canceling processing, which is supplied from the television receiver to input terminal $I_1$, is converted to a digital form by A/D converting circuit 12 and is supplied to an input terminal of the pseudo ghost producing circuit 13 and to one input terminal of subtracting circuit 14. Pseudo ghost producing circuit 13 detects a ghost generated at the present time on the basis of the amount of distortion present in a specified waveform during a predetermined period of time, such as, for example, the vertical retrace interval of the video signal, thereby producing a pseudo ghost. The pseudo ghost signal from circuit 13 is supplied to the other input terminal of subtracting circuit 14 through gate circuit 16 and is subtracted from the original video signal supplied to the other input terminal of subtracting circuit 14.

The video signal, from which the distortion of the waveform is removed by this subtracting operation, is converted to an analog form by D/A converting circuit 15 and is returned to the television receiver through output terminal $O_1$. The construction and operation of pseudo ghost producing circuit 13 are already disclosed in many known publications such as commonly assigned Unexamined Japanese Patent Application (OPI) No. 63-189053, for example, and the description with respect to such construction and operation are therefore omitted here.

When the channel pulse and the GC ON/OFF signal respectively generated at input terminals $I_2$ and $I_3$ are "low" (low voltage state in the preferred embodiment), logic circuit 17, sometimes a single digital logic element such as a logic gate, mono-multi vibrator or the like, opens gate circuit 16 by outputting a "low" signal onto signal line 19 connected to gate circuit 16. Thus, the pseudo ghost produced by pseudo ghost producing circuit 13 is supplied to one of the inputs of subtracting circuit 14, and the ghost-canceled video signal is supplied to output terminal $O_1$ connected to the television receiver.

When the GC ON/OFF signal in input terminal $I_3$ is "high" (high voltage level in the preferred embodiment), the output signal of logic circuit 17 also is "high" so that gate circuit 16 is closed and output signal lines of respective bits are grounded, thereby outputting a signal indicating that all of the bits are zero. Thus, the original video signal supplied to the one input terminal of subtracting circuit 14 passes through subtracting circuit 14 as it is, and is converted to an original analog video signal by D/A converting circuit 15. The converted signal is then supplied to the television receiver through output terminal $O_1$.

Figure 1:
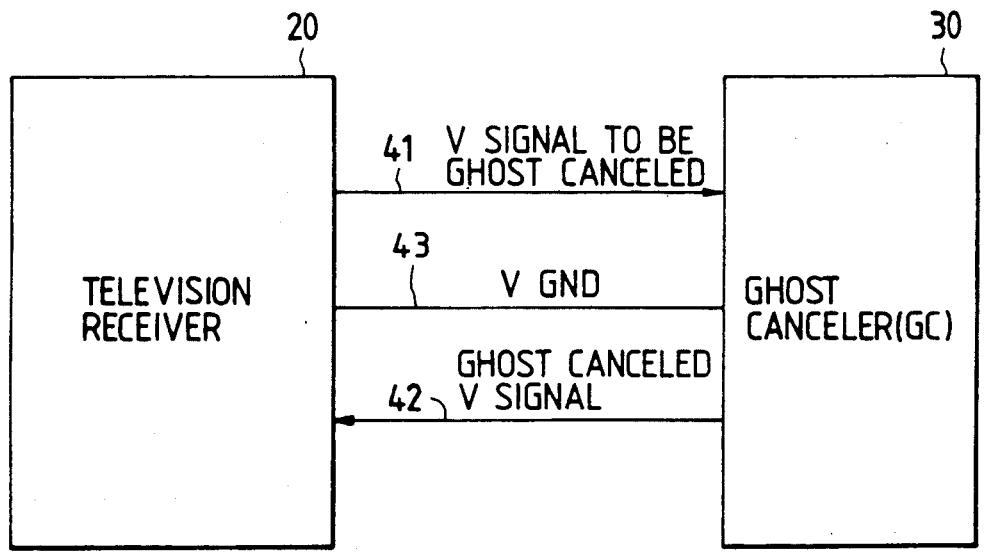
FIG. 1 (PRIOR ART) is a block diagram of a known ghost canceling arrangement.
Figure 3:
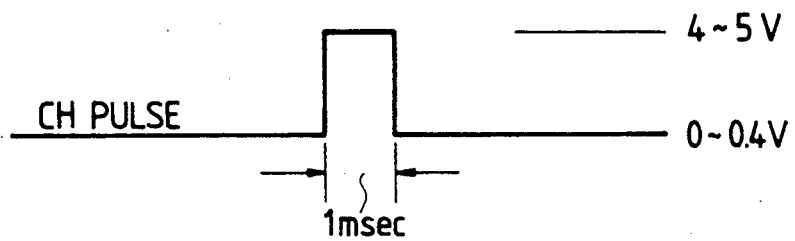
FIG. 3 is diagram of a waveform of a channel pulse.

When the GC ON/OFF signal in input terminal $I_3$ is "low", and the channel pulse in input terminal $I_2$ is "high" during 1 msec. as shown by the waveform in FIG. 3, the output of logic circuit 17 is "high" during a predetermined period. The rising portion of this channel pulse indicates that the channel of the television receiver is being changed. As a result, the output of gate circuit 16 becomes zero in voltage during a predetermined period and the original video signal is returned to the television receiver as is (without alteration) through output terminal $O_1$.

The ghost-canceled video signal or the original video signal mentioned above is also supplied to output terminal $O_2$ connected to the video input terminal of the VTR. The sound signals of the right and left sound channels, respectively supplied to input terminals $I_4$ and $I_5$ from the television receiver are supplied to sound output terminals $O_3$ and $O_4$ as is without modification. Accordingly, it is possible to perform a direct picture recording operation without using the television receiver by connecting a cable having a video signal line and an audio signal line to output terminal group 18.

Figure 4:
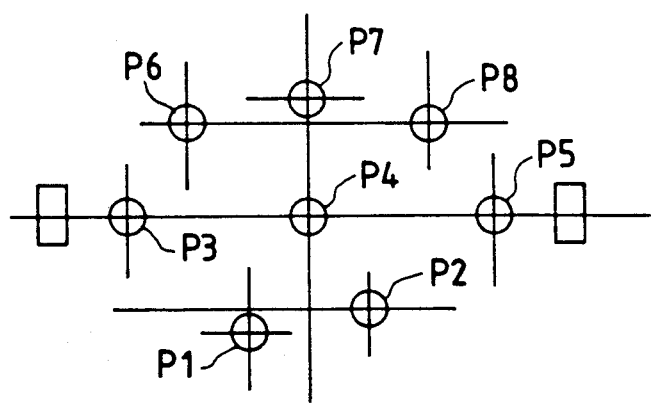
FIG. 4 is a diagram of one example of a pin arrangement of an input-output terminal group with respect to the television receiver.

FIG. 4 shows an example of a pin arrangement of input-output terminal group 11 shown in FIG. 2. The pin-terminal correspondence is as follows:

| Terminal | Pin | Function |
| --- | --- | --- |
| $I_5$ | P1 | left channel sound |
| $G_2$ | P2 | ground for audio |
| $I_2$ | P3 | CH PULSE for channel change |
| $I_3$ | P4 | GC ON/OFF for indicating ghost cancelling |
| $I_4$ | P5 | right channel sound |
| $I_1$ | P6 | original video signal |
| $G_1$ | P7 | ground for video |
| $O_1$ | P8 | video output |

Of course, the invention is not limited to this particular pin arrangement. It is given merely as one concrete example of a pin arrangement that can be used. As detailed above, the ghost canceler comprises input-output terminal group 11 including sound terminals and output terminal group 18 including ghost canceled video and sound signals. Accordingly, the sound signal and the ghost canceled video signal can be directly supplied to the proper input terminals of a VTR without using the television receiver, thereby greatly improving the convenience of use.

The ghost canceler is provided with input terminal $I_3$ for receiving the ghost canceling commands from the television receiver and outputs the ghost canceled signal only during this period of these commands. Accordingly, it is not necessary to provide a switching circuit for forming a return loop within the television receiver when it is not necessary to perform the ghost canceling processing.

Further, the ghost canceler is provided with input terminal $I_2$ for receiving the information about the switching operation of the channels from the television receiver and outputs the original video signal as is during a predetermined period immediately after the reception of this information. Accordingly, the disturbance on the display screen caused by the switching operation of the channels is effectively avoided.

While this invention has been described in connection with what is presently considered to be the most practical and preferred embodiment, it is to be understood that the invention is not limited to the disclosed Embodiment; on the contrary, the present invention is intended to cover various modifications and equivalent arrangements included within the spirit and scope of the appended claims.

What is claimed is:

1. A ghost canceler, comprising:
   a first terminal group including
      a first terminal for receiving an original video signal to be ghost canceled,
      a second terminal for receiving commands for causing ghost canceling processing to occur,
      a third terminal for receiving information indicative of a television channel change,
      fourth terminals for receiving sound signals from a television receiver, and
      a fifth terminal for transmitting to the television receiver a video signal, the video signal transmitted to the television receiver being a) the original video signal within a period of time during which there is not received a command indicating that said ghost canceling processing is to take place, or during a predetermined period immediately after the reception of said information indicating a television channel change, and b) a ghost cancelled video signal cancelled video signal during other times;
   a ghost canceling means, coupled so as to receive said original video signals from said first terminal, for ghost canceling said original video signals; and
   a second terminal group including
      a sixth terminal for providing an output video signal for coupling to an external device, and
      seventh terminals for providing said sound signals from the television receiver for coupling to an external device.

2. A ghost canceler according to claim 1 wherein said ghost canceling means comprises:
   an analog-to-digital (A/D) converter, coupled to said first terminal for receiving an analog video signal and converting it to a digital signal;
   a pseudo ghost production circuit, coupled to said A/D converter for generating a pseudo ghost signal;
   a logic circuit coupled to said second and third terminals for receiving signals indicative of whether or not a television channel is being changed and whether or not ghost canceling is commanded;
   a gate circuit, controlled by said logic circuit, for gating an output of said pseudo ghost production circuit;
   a subtractor circuit having a first input coupled to an output of said A/D converter and a second input coupled to an output of said gate circuit for providing a difference signal output; and
   a digital to analog (D/A) converter coupled to an output of said subtractor circuit for providing an analog video signal to said fifth and sixth terminals.

* * * * *